UNITED STATES PATENT OFFICE.

MARTIN HERZBERG, AUGUST BLANK, AND ADOLF ISRAEL, OF ELBERFELD, GERMANY, ASSIGNORS TO THE FARBENFABRIKEN, VORMALS FR. BAYER & CO., OF SAME PLACE.

BLACK AZO DYE.

SPECIFICATION forming part of Letters Patent No. 561,709, dated June 9, 1896.

Application filed November 8, 1895. Serial No. 568,349. (Specimens.) Patented in England April 10, 1893, No. 7,330; in France May 2, 1893, No. 229,776, and in Austria-Hungary September 5, 1893, No. 3,397 and No. 3,282.

*To all whom it may concern:*

Be it known that we, MARTIN HERZBERG, AUGUST BLANK, and ADOLF ISRAEL, doctors of philosophy, chemists, assignors to the FARBENFABRIKEN, VORMALS FR. BAYER & CO., of Elberfeld, Prussia, Germany, residing at the same place, have invented a new and useful Improvement in the Manufacture of Black Azo Dyes, (for which the aforesaid FARBENFABRIKEN, VORMALS FR. BAYER & CO. have already obtained Letters Patent, as follows: in France, No. 229,776, dated May 2, 1893; in England, No. 7,330, dated April 10, 1893, and in Austria-Hungary, tom. 43, fol. 3,397, tom. 27, fol. 3,282, dated September 5, 1893;) and we do hereby declare the following to be an exact and clear description of our invention.

Our invention relates to the production of new black azo dyes, which consists in first producing the mixed dyestuffs from one molecular proportion of the tetrazo compounds of paradiamins—such as benzidin, its analogous and homologous bodies—one molecular proportion of amidonaphthol disulfo-acid ($NH_2$:$SO_3H$:$SO_3H$:$OH = 1.3.6.8$) or an alkaline salt thereof, and one molecular proportion of a metadiamin, such as metaphenylenediamin or metatoluylendiamin, and in subsequently allowing one molecular proportion of diazotized acetylparaphenylenediamin to act on the aforesaid mixed dyestuffs. The dyestuffs thus obtained produce on unmordanted cotton deep-black shades, fast to the action of alkali and acid.

In carrying out our invention practically we can proceed as follows: 18.4 parts, by weight, of benzidin are converted in the well-known manner into the tetrazo compound by means of fifty-five parts, by weight, of hydrochloric acid (20° Baumé) and 13.8 parts, by weight, of sodium nitrite. The so-formed tetrazo solution is then stirred into a mixture prepared by mixing 34.1 parts, by weight, of the acid sodium salt of amidonaphthol disulfo-acid ($NH_2$:$SO_3H$:$SO_3H$:$OH = 1.3.6.8$) in three hundred and eighty parts, by weight, of water, the whole being well cooled down by means of ice. The formation of the resulting intermediate product is complete after about twenty-four hours—viz., when the liquid obtained by filtering a test portion of the reaction mixture and mixing the filtrate with an alkaline solution of the so-called "Schäffer's" salt gives no longer a dyestuff. When this stage is arrived at, eighteen parts, by weight, of metaphenylenediamin hydrochlorid dissolved in a sufficient quantity of water, are added to the above acid mixture. After standing and stirring well for about twelve hours the so-formed dyestuff is filtered off and mixed again with cold water with the addition of sixty kilos, by weight, of sodium carbonate, ($Na_2CO_3$.) Into this solution the diazo compound, prepared by diazotizing fifteen parts, by weight, of acetylparaphenylenediamin in the well-known manner, is stirred. After about twelve hours the mixture is heated and the dyestuff is salted out by means of common salt and filtered off. It may be purified by redissolving in hot water and salting out. After filtering off, pressing, and drying the dyestuff, which corresponds probably with the formula

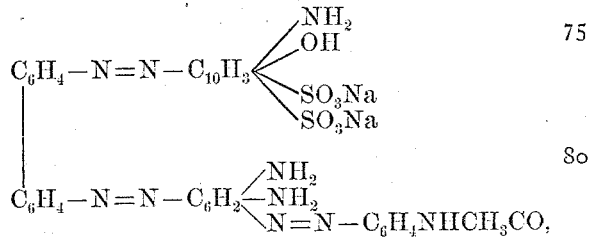

forms a black powder, soluble in water with a black color, almost insoluble in alcohol, strong soda-lye, and strong sodium-carbonate solution, soluble in ammonia liquor with a black color. On adding dilute mineral acids to the solution of the dyestuff in water a violet-black precipitate is obtained. By concentrated sulfuric acid (66° Baumé) it is dissolved with a bluish-black color, a black precipitate being formed when the above sulfuric-acid solution is mixed with a large quantity of ice-water. The dyestuff produces on unmordanted cotton black shades of great resistance to the action of alkali and acid.

The same product is probably obtained if the intermediate product from one molecular proportion of tetrazotized benzidin and one molecular proportion of the aforesaid amidonaphtholdisulfo-acid ($NH_2:SO_3H:SO_3H:OH = 1:3:6:8$) is mixed in an acetic acid or alkaline solution with one molecular proportion of the chrysoidin-like product, which results from the combination of diazotized acetylparaphenylenediamin with metaphenylenediamin, and if the resulting mixture is finally alkalized with sodium carbonate, according to the directions given in the above example, the combination of the employed components can be effected in alkaline as well as in acid solution. However, it must be pointed out that the amidonaphtholdisulfo-acid is most practically coupled in a mineral acid solution, while acetylparaphenylenediamin (or another equivalent thereof) must always be coupled in the presence of an alkali.

Instead of benzidin any paradiamin may be substituted in molecular proportion in the above example, and instead of metaphenylenediamin hydrochlorid any other metadiamin may be employed.

When, therefore, in this application we refer to "benzidin," we mean thereby to include also all of its equivalents—namely, compounds of a similar nature. When we refer to "metaphenylenediamin," we mean also to include all other metadiamins which possess similar properties, and likewise the known metadioxy derivatives of the benzene series which yield dyestuffs of analogous properties. Of course we mean also to include the acetylnaphthylenediamin compound instead of acetylparaphenylenediamin. The dyestuffs obtained by such substitutions are all intended to be included in the present invention.

Having now described our invention and in what manner the same is to be performed, what we claim as new, and desire to secure by Letters Patent, is—

1. The process for the production of substantive black azo dyes, which consists in combining one molecular proportion of tetrazotized paradiamins, first with one molecular proportion of amidonaphthol disulfo-acid ($NH_2:SO_3H:SO_3H:OH=1:3:6:8$), or an alkaline salt thereof, then with one molecular proportion of a metadiamin, such as metaphenylenediamin, and in finally coupling the so-formed mixed azo dyestuffs with one molecular proportion of diazotized acetylparaphenylenediamin, in the manner hereinbefore described.

2. The process for the production of substantive black azo dyes, which consists in combining one molecular proportion of tetrazotized benzidin, first with one molecular proportion of amidonaphthol disulfo-acid ($NH_2:SO_3H:SO_3H:OH=1:3:6:8$), or an alkaline salt thereof, then with one molecular proportion of a metadiamin, such as metaphenylenediamin, and in finally coupling the so-formed mixed azo dyestuff with one molecular proportion of diazotized acetylparaphenylenediamin, in the manner herereinbefore described.

3. The new class of dyestuffs herein described, of which the following dyestuff is an example,

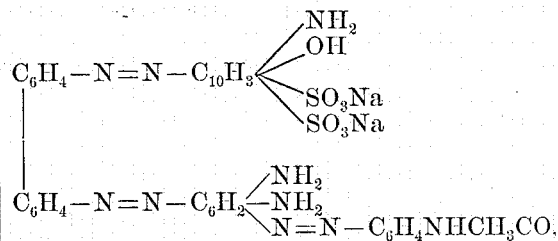

and which are black powders, soluble in water with a black color, dark flakes being precipitated when the watery solution is mixed with dilute mineral acids, almost insoluble in alcohol, strong soda-lye and sodium carbonate solution, being dissolved by concentrated sulfuric acid (66° Baumé) with a bluish-black color, black flakes being precipitated on the addition of a large quantity of ice-water to the sulfuric-acid solution, producing on unmordanted cotton black shades of great resistance to the action of alkali and acid.

In testimony where we have signed our names in the presence of two subscribing witnesses.

MARTIN HERZBERG.
AUGUST BLANK.
ADOLF ISRAEL.

Witnesses:
F. H. STRAUSS,
A. STRAUSS.